Patented Feb. 7, 1933

1,896,899

UNITED STATES PATENT OFFICE

WOLFGANG JAECK AND JOSEPH LANG, OF BASEL, SWITZERLAND, ASSIGNORS TO THE FIRM SOCIETY OF CHEMICAL INDUSTRY IN BASLE, OF BASEL, SWITZERLAND

PREPARATION SUITABLE AS WETTING AGENT

No Drawing. Application filed March 13, 1931, Serial No. 522,517, and in Switzerland March 19, 1930.

Among the known wetting agents are the sulfonic acids of alkylated or aralkylated hydrocarbons, the sulfonic acids of hydroaromatic hydrocarbons, the condensation products obtainable by the action of benzoin and thereupon of aliphatic alcohols on the sulfonic acids of aromatic hydrocarbons, and salts of these several compounds, which have acquired some importance. There are certain difficulties in the way of the general application of these agents, for instance their comparatively little solubility in cold water which makes it difficult to prepare stock solutions. It is also impossible to perform the operation of wetting with dilute solutions of these agents by spraying or moistening the fibrous materials in the form of spools, cops, bobbins, warp beams, loose wool, carding webs and the like, because the dilute solutions in greater part drop from the goods instead of wetting them and are thereby lost.

According to this invention preparations in the form of concentrated solutions of the said agents are made by dissolving the agent in water with addition of a polyhydric alcohol or a derivative or a homologue thereof, such as glycol, glycerine or bodies of similar action, such as, among others, thiodiglycol, dihydroxydiethylene-oxide, glycolmono-ethyl-ether, glycerine-$\alpha$-ethyl-ether, or, quite generally, compounds of the general formulæ $R-O-R_1$, $R-S-R_1$, $R-S-S-R_1$, wherein $R$ is the residue of a polyhydric aliphatic alcohol or an ester or ether thereof, and $R_1$ is either the residue of a polyhydric aliphatic alcohol or an ester or ether thereof, or is alkyl, acyl, aryl or alkylaryl.

For example, a cold stable solution of about 6 per cent. strength can be made from the product which is known in commerce as Nekal BX, and is probably a butylated naphthalene sulfonic acid. If instead of water there is used a mixture of 25 parts of glycerine and 75 parts of water there can be obtained directly with aid of heat a solution of 20 per cent. strength which remains clear and of high fluidity on cooling.

Similar results are obtained with the condensation product described in Example 1 of Patent No. 1,833,245.

Instead of glycerine, a compound having similar effect may be used; also the proportion of the polyhydric alcohol to the water may be varied as desired, for instance there may be used a mixture of 10 parts of glycerine and 90 parts of water, or a mixture containing more than 25 per cent. of glycerine.

Still more concentrated solutions may be obtained with thiodiglycol. For instance, one succeeds very easily in producing a solution stable in the cold, consisting of 50 parts of the product of Example 1 of Patent No. 1,833,245, 43 parts of water, and 20 parts of thiodiglycol, or of 35 parts of the sodium salt of the dibutylated naphthalene sulfonic acid, 60 parts of water, and 20 parts of thiodiglycol.

To the solutions may be added the usual protective materials, such as formaldehyde, borax, salicylic acid, hexamethylenetetramine, or the like.

What we claim is:—

1. An aqueous solution consisting of an alkali salt of a sulfonic acid having a capacity for inducing wetting, water, and a polyhydric alcohol, this solution containing at least 20 per cent. of the alkali salt of the said sulfonic acid.

2. An aqueous solution consisting of an alkali salt of a sulfonic acid containing a naphthalene nucleus and having a capacity for inducing wetting, water, and a polyhydric alcohol, this solution containing at least 20 per cent. of the alkali salt of the said sulfonic acid.

3. An aqueous solution consisting of an alkali salt of a sulfonic acid containing a naphthalene nucleus and having a capacity for inducing wetting, water, and thiodiglycol, this solution containing at least 20 per cent. of the alkali salt of the said sulfonic acid.

4. An aqueous solution consisting of an alkali salt of a dibutylated naphthalene monosulfonic acid, water, and thiodiglycol, this solution containing at least 20 per cent. of the alkali salt of a dibutylated naphthalene monosulfonic acid.

5. An aqueous solution consisting of an alkali salt of a condensation product of naphthalene-β-sulfonic acid, benzoin and isopropylalcohol, water, and thiodiglycol, this solution containing at least 20 per cent. of the alkali salt of a condensation product of naphthalene-β-sulfonic acid, benzoin and isopropylalcohol.

In witness whereof we have hereunto signed our names this 5th day of March, 1931.

WOLFGANG JAECK.
JOSEPH LANG.